United States Patent
Li et al.

(10) Patent No.: US 7,392,055 B2
(45) Date of Patent: Jun. 24, 2008

(54) METHOD FOR ALLOCATING RESOURCES IN A WIRELESS DATA SYSTEM BASED ON SYSTEM LOADING

(75) Inventors: Patrick Li, Mendham, NJ (US); Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 833 days.

(21) Appl. No.: 10/600,714

(22) Filed: Jun. 23, 2003

(65) Prior Publication Data

US 2004/0259559 A1    Dec. 23, 2004

(51) Int. Cl.
*H04Q 7/20* (2006.01)
(52) U.S. Cl. .................. 455/452.2; 455/452.1
(58) Field of Classification Search .................. 455/453, 455/450, 509, 422, 464, 451, 452
See application file for complete search history.

(56) References Cited

U.S. PATENT DOCUMENTS

| | | | |
|---|---|---|---|
| 5,884,174 A * | 3/1999 | Nagarajan et al. ........... | 455/436 |
| 6,519,462 B1 * | 2/2003 | Lu et al. ...................... | 455/453 |
| 6,567,670 B1 * | 5/2003 | Petersson ..................... | 455/522 |
| 6,574,213 B1 * | 6/2003 | Anandakumar et al. ..... | 370/349 |
| 6,690,929 B1 * | 2/2004 | Yeh .............................. | 455/406 |
| 6,940,824 B2 * | 9/2005 | Shibutani .................... | 370/252 |
| 6,947,750 B2 * | 9/2005 | Kakani et al. ............ | 455/452.2 |
| 2002/0132611 A1 * | 9/2002 | Immonen et al. ............ | 455/414 |
| 2003/0060208 A1 * | 3/2003 | Achour et al. .............. | 455/450 |
| 2003/0199278 A1 * | 10/2003 | Lee et al. ................. | 455/452.2 |
| 2004/0143842 A1 * | 7/2004 | Joshi ........................... | 725/32 |
| 2004/0176090 A1 * | 9/2004 | Mudigonda et al. ......... | 455/434 |
| 2005/0026642 A1 * | 2/2005 | Lee et al. .................... | 455/522 |

* cited by examiner

*Primary Examiner*—Creighton Smith

(57) ABSTRACT

Resource allocation in a wireless data system determines a load condition of the system and adapts a target quality of service (QoS) characteristic, accordingly. Data transmission parameters may be assigned, or adapted, for the wireless units based on the adapted target QoS characteristics. Resources are allocated to data transmissions between wireless units based on these parameters. As the system load decreases, the target QoS characteristic is adapted so that more resources will be allocated to the wireless unit, and the QoS will improve. The adapted QoS threshold may be a data error rate or target fill efficiency for each wireless unit.

26 Claims, 5 Drawing Sheets

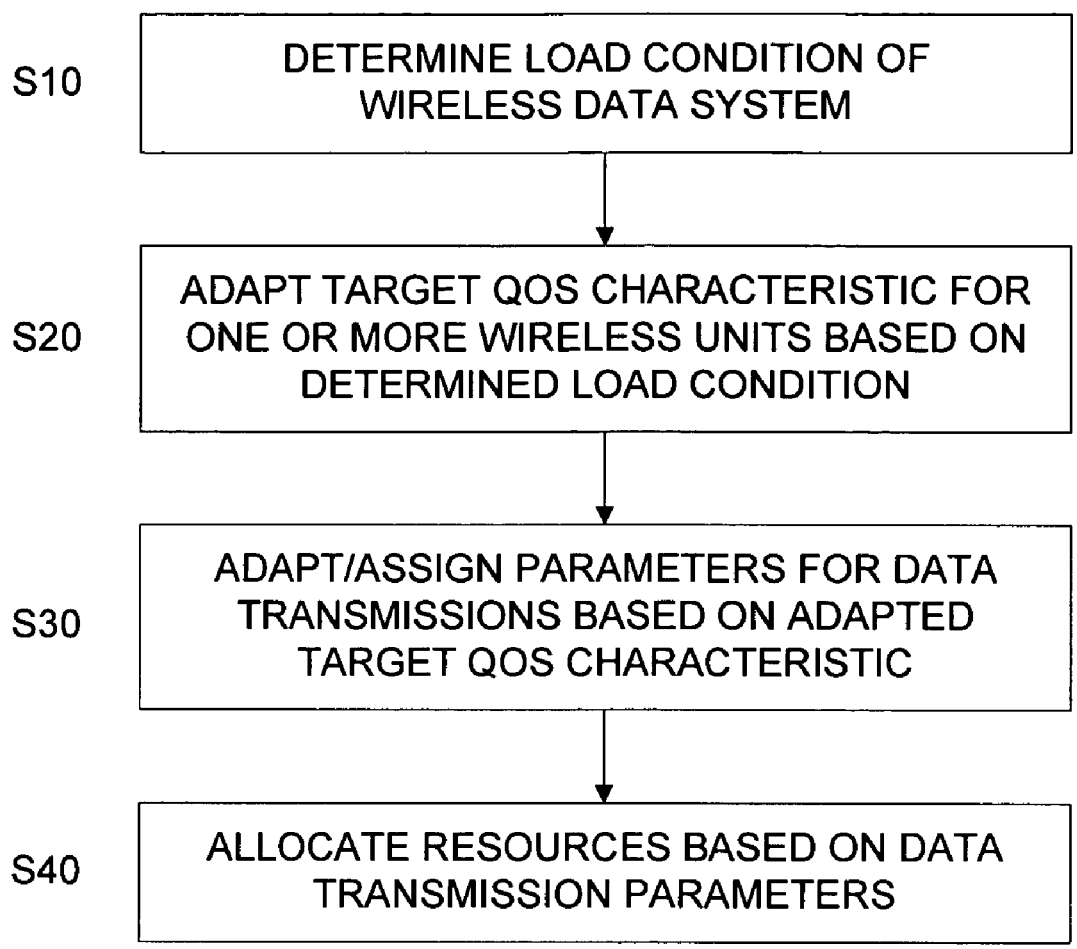

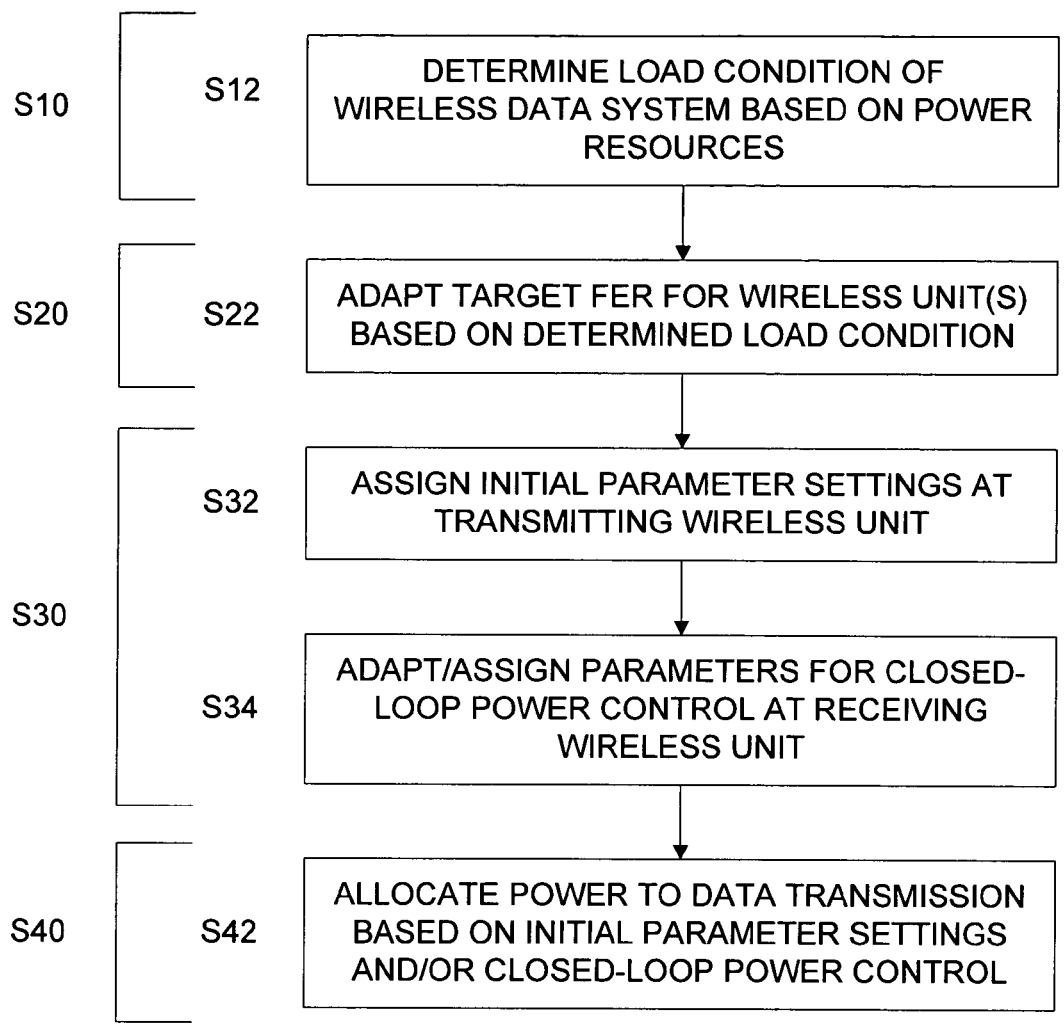

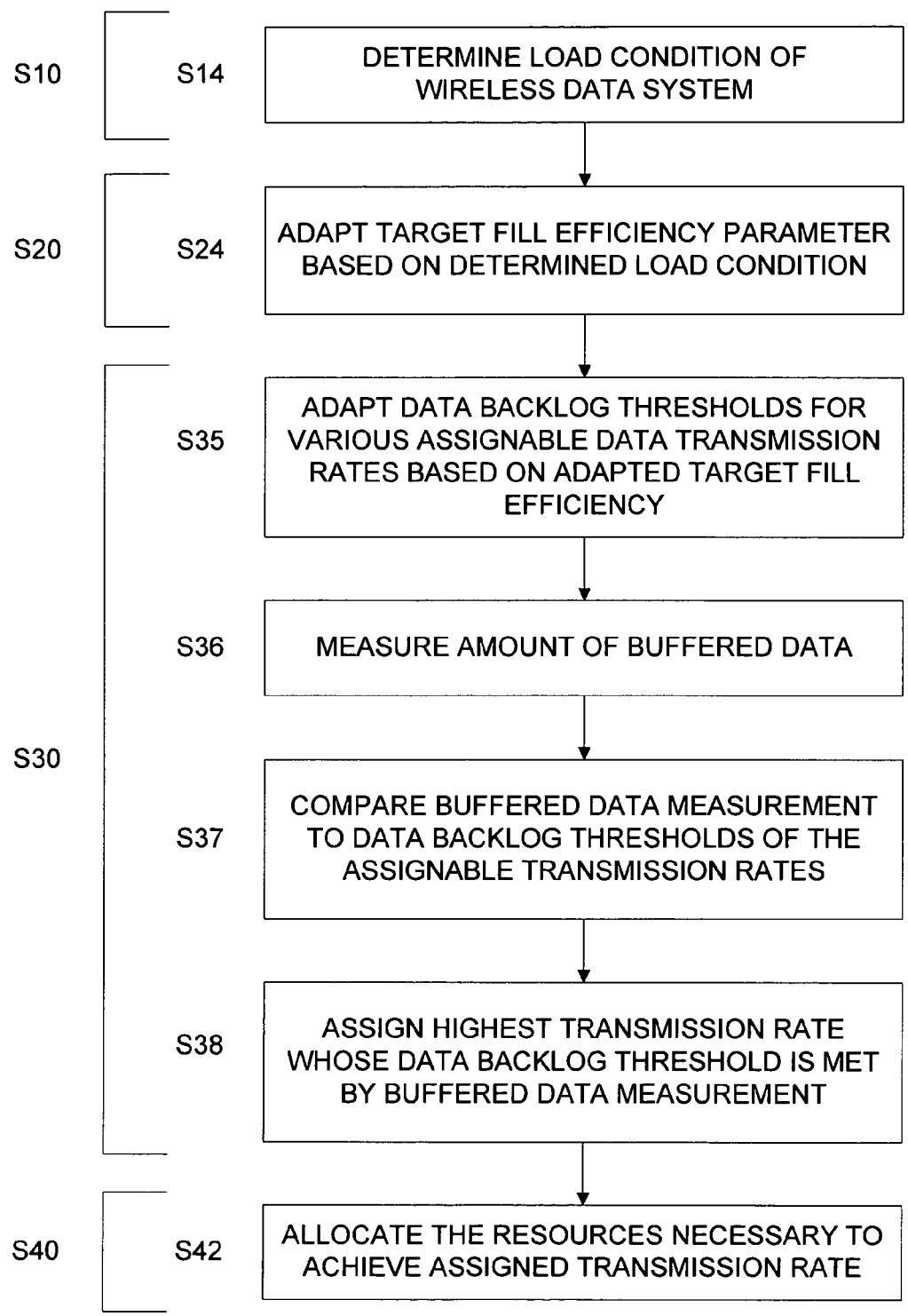

METHOD FOR ALLOCATING RESOURCES IN A WIRELESS DATA SYSTEM BASED ON SYSTEM LOADING

BACKGROUND OF THE INVENTION

Quality of service (QoS) is an important aspect of wireless data system performance. Characteristics such as transmission rates and error rates are indicators of the QoS provided to individual users. Better QoS can generally be achieved for each user when the system is experiencing a lighter load because there is less contention for shared resources such as power, hardware, spreading codes, etc. During periods of heavy loads, however, the system may need to sacrifice the QoS provided to its users in order to increase overall system performance in terms of throughput and efficiency.

In order to ensure that each user is offered the highest possible QoS, a wireless data system may employ conventional resource management and scheduling algorithms to automatically adjust the resources allocated to each user based on a current level of contention and/or user fairness criteria. However, when the load decreases to a certain point, such algorithms are no longer able to adjust the allocation of system resources in order to improve user QoS.

SUMMARY OF THE INVENTION

According to exemplary embodiments, the present invention provides a method of allocating resources in a wireless data system to wireless units based on a target quality of service (QoS) characteristic that is adapted based on a load condition of the wireless data system.

According to an exemplary embodiment, the target QoS characteristic may be adapted in order to assign each wireless unit a QoS parameter corresponding to a determined load condition of the system, and allocate the system resources accordingly. Thus, when the load is light, the system may assign excess resources to the user in order to improve the QoS for each user.

As the system load becomes lighter, the target QoS characteristic for a wireless unit may be adapted such that a data transmission rate for the wireless unit will increase.

For example, in an exemplary embodiment, the target QoS characteristic may be a target data error rate assigned to a wireless unit. When the system load decreases, the target error rate assigned to the wireless unit may be lowered, causing the system to allocate more power to the wireless unit. Because the wireless unit experiences fewer errors in data transmissions, fewer retransmissions are required, thus causing the data transmission rate to increase.

In another exemplary embodiment, the target QoS characteristic may be a target fill efficiency assigned to a wireless unit, e.g., in a wireless data system utilizing bursty transmissions. In such systems, a wireless unit may be assigned a particular data transmission rate based on whether the amount of buffered data would fill a certain percentage of a burst corresponding to that rate. When the system load becomes lighter, the target fill efficiency may be lowered, thus allowing for the wireless unit to be assigned a higher data rate. Accordingly, the system may allocate longer burst durations to achieve the assigned rate.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 1 is a flowchart illustrating a method for allocating system resources according to an exemplary embodiment of the present invention;

FIG. 2 is a flowchart illustrating a method for allocating system resources according to an exemplary embodiment where the target QoS characteristic is a target data error rate;

FIG. 3 is a flowchart illustrating a method for allocating system resources according to an exemplary embodiment where the target QoS characteristic is a target fill efficiency for data bursts.

DETAILED DESCRIPTION OF EMBODIMENTS

Figure 4A:
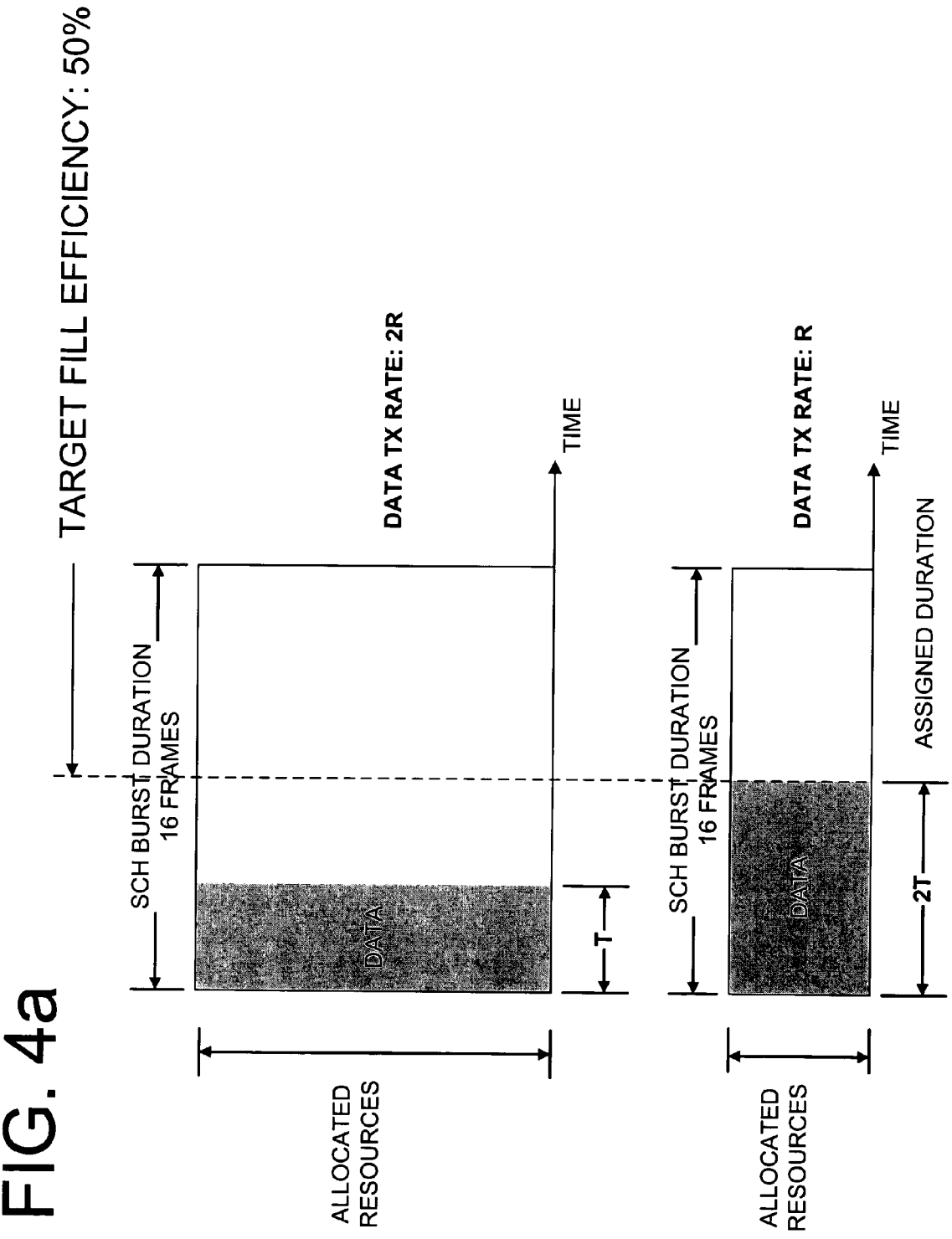
FIGS. 4a and 4b illustrate the relationship between the data backlog threshold and a target fill efficiency parameter according to an exemplary embodiment of the invention.

The present invention provides techniques for improving the quality of service (QoS) available to individual users of a wireless data system as the load on the system decreases. For instance, these techniques can allow excess system resources to be assigned to various users during periods of light loading, when such resources would not normally be utilized.

Exemplary embodiments of the present invention include techniques to adapt QoS parameters, which are used to allocate system resources to wireless units, based on a determined system load. The techniques described in accordance with the exemplary embodiments may be employed in addition to conventional multi-user scheduling and resource sharing algorithms.

According to an exemplary embodiment, each user employs a wireless unit to receive data communication services from a wireless data system. Such wireless units are configured to transmit and/or receive data over the wireless data system. Such wireless units may include, but are not limited to, laptop computers, personal digital assistants (PDAs), mobile telephones, and the like. Hereafter, the terms "user" and "wireless unit" can be used interchangeably to describe exemplary embodiments of the invention.

The QoS offered to a particular user in a wireless data system can be adjusted in several ways. For example, the system may assign a wireless unit a higher data transmission rate, thus resulting in a lower download latency.

Also, download latency can be decreased by assigning a lower target data error rate (e.g., bit or frame data error rate), thereby lowering the number of retransmissions.

A target data error rate can be achieved in several ways, including but not limited to: 1) requesting the receiving side of the wireless link to maintain a lower target data error rate through closed loop power control and/or 2) by setting a higher initial signal-to-noise set-point (e.g., bit energy over thermal noise: Eb/Nt) for a data burst.

The first approach for lowering target error rate is more appropriate for longer data transmissions where the power control loop has time to converge to the target data error rate. This may involve the wireless data receiving data transmissions to adapt one or more parameters used in closed-loop power control, according to well-known techniques.

The second approach involves an initial, one-time adaptation of parameter settings for a data transmission. It is more appropriate for shorter bursty data transmissions where the power control loop does not have time to converge to the target so the initial parameter settings play a major role in achieving the intended data error rate over the burst duration.

These two approaches for controlling the data error rate can be used separately or in combination. More detailed examples of these techniques will be described below in connection with steps S32 and S34 of FIG. 2.

In order to achieve higher transmission rates and lower error rates in a wireless system, the system must allocate more resources to each wireless unit. For instance, to achieve a lower error rate for a particular user, the system generally must allocate more power for the data transmissions to that user's wireless unit.

Also, to assign higher data transmission rates to users, the system can increase the allocation of other resources in addition to power. For example, in third generation (3G) systems such as cdma2000, resources such as supplemental channels (SCH), additional spreading codes (e.g., channelization Walsh codes), and an increased amount of infrastructure hardware can be allocated to increase transmission rates.

When a wireless data system is experiencing lighter loads, more system resources are available to support data channels. Accordingly, the increased expenditure of resources to achieve the improved QoS for individual users can be justified.

Referring back to the cdma2000 example, data transmissions are bursty and resource allocations are relatively short-term. Thus, a more aggressive resource assignment at lower loading is justified because it decreases the risks of blocking data transmissions of other users.

Principles underlying the exemplary embodiments of the present invention described hereafter can be utilized for any type of wireless data system or network, as will be contemplated by those skilled in the art. However, for the purposes of providing a thorough and detailed description, certain exemplary embodiments are described below as being implemented in code-division multiple access (CDMA) systems, and more particularly, to third generation (3G) systems such as cdma2000. Such exemplary embodiments should not be construed as being limited to such systems.

FIG. 1 is a flowchart illustrating a method for allocating system resources according to an exemplary embodiment of the present invention.

In step S10, a load condition of the wireless data system is determined. The load of a wireless data system (e.g., cdma2000) can be characterized by a number of metrics, or measured parameters. Such metrics may include, but are not necessarily limited to, the total forward link power used (or, alternatively, the excess forward link power available), total reverse link interference rise above thermal noise, the number of data users in the system, the number of active supplemental channel (SCH) bursts in the system, the number of Walsh codes used, etc. These metrics can be ascertained by the system according to techniques well-known in the art.

The load condition can be characterized as either HIGH or LOW, e.g., by determining whether or not a load metric, or a combination of load metrics, exceeds or fails to exceed certain thresholds.

For example, a load metric may be the total forward link power currently used in the system. This metric may be normalized (where total available forward link power=1.0). In such an example, a threshold may be set at 0.50, such that a HIGH load condition is determined if the load metric indicates that 0.5 or more of the normalized forward link power is currently being used. If less than 0.5 is used, a LOW condition may be determined.

Further, the system may have a highest (e.g., HIGH) and lowest (e.g., LOW) determinable load condition, each having an associated threshold. The load condition may further include discrete intermediate gradations, each having an associated threshold applied to one or more load metrics. In such an example, the determinable load conditions may include a MEDIUM condition.

For instance, if the load metric is a normalized amount of the forward link power being used, a threshold for a HIGH load condition may be set at 0.75, while a threshold for a MEDIUM load condition is set at 0.50 and a threshold for a LOW load condition is set at 0.25.

Alternatively, the system load can be characterized by a continuous function obtained, for example by, linear interpolation between the thresholds of HIGH and LOW load condition points. In the above example, the load condition may be characterized as the normalized forward link power being used, itself.

Other examples of the determination of load condition will be described below with respect to step S12 in FIG. 2 and step S14 in FIG. 3.

Referring to step S20 of FIG. 1, a target QoS characteristic for one or more wireless units can be adapted based on the determined load condition. As described above, the adapted target QoS characteristic may be a target data error rate assigned to the wireless unit(s).

As will be described in more detail below with respect to step S22 in FIG. 2, a wireless unit may initially be assigned a target error rate based on well-known resource management algorithms that assume a full system load. After the actual system load is determined according to step S10, the adapting step S20 may include determining a difference between the full system load and the determined load, and decreasing the initially assigned target error rate by an amount proportional to this difference.

In an alternative exemplary embodiment, the target QoS characteristic may be a target fill efficiency, which is used to assign a particular data transmission rate to the wireless unit.

For example, a cdma2000 system can assign a SCH bursts to a wireless units when the amount data buffered at the wireless unit exceeds a certain amount. The system can further assign a transmission rate to the wireless unit if the buffered data would fill a particular percentage (i.e., target fill efficiency) of a data burst configured for that particular rate. Accordingly, the system may allocate the resources (e.g., spreading codes, power, etc.) for the SCH burst transmission, which is necessary to achieve the assigned rate.

In this example, the target fill efficiency associated with the burst transmissions may be determined using well-known methods that assume a maximum system load. After the actual system load is measured (step S10), the adapting step S20 may decrease the target fill efficiency by an amount proportional to the difference between the maximum load and the determined load. This example will be discussed in more detail below with respect to steps S24 and S26 in FIG. 3, In another exemplary embodiment, multiple target QoS characteristics (e.g., both target error rate and target fill efficiency) may be adapted. In such an embodiment, resources may be allocated to a particular wireless unit based on one or both of these characteristics.

In step S30, one or more parameters are assigned or adapted for transmitting data between wireless units. For example, if the target QoS characteristic is a target frame error rate (FER), the system could instruct the wireless unit receiving data transmissions to adjust the parameters used in a closed-loop power control in order to maintain the smaller target FER. Alternatively, the system may assign a higher initial signal-to-noise set-point (e.g., $E_b/N_t$) for the data burst, which is used to determine the transmitting power for the burst. A more detailed description of these techniques will be provided below with respect to steps S32 and S34 of FIG. 2.

In step S40, system resources are allocated based on the parameters assigned or adapted in step S30. For example, if the QoS threshold is a target FER, the transmitting wireless unit may increase the power allocated for data transmissions based on an assigned Eb/Nt, instructions issued by the receiving wireless unit during closed-loop power control, or a combination of both.

In yet another example, where the target QoS characteristic is target fill efficiency, step S30 may assign a particular data transmission rate to an SCH data burst assigned for a transmitting wireless unit.

Specifically, for each available transmission rate, the SCH burst can hold a certain capacity of data. Thus, a data backlog threshold can be defined for each transmission rate, which indicates the particular amount of data needed to satisfy the target fill efficiency of the burst for that transmission rate. When the amount of buffered data in the wireless unit exceeds this data backlog threshold, the wireless unit can be assigned the corresponding burst rate. The system may then allocate the resources necessary for the SCH burst to achieve the assigned rate.

Data Error Rate as Target QoS Characteristic

According to an exemplary embodiment, the QoS threshold adapted in step S20 can be a target data error rate for one or more wireless units.

In wireless data systems, a target data error rate, e.g., FER, is determined by the following tradeoffs. The error rate remains relatively high so that the average power requirements per user (e.g., per CDMA channel) can be lowered. However, the FER is kept below a certain value to prevent the amount of errors and resulting retransmissions from causing a catastrophic drop in throughput. Such an approach may be appropriate for situations where the system is heavily loaded because it balances aggregate system capacity (power requirements per user) with the individual user performance. However, during periods of light loading, when there is an excess of power resources, the per-burst FER can be lowered to achieve less retransmission and thus lower download latency.

FIG. 2 is a flowchart more particularly illustrating the method of FIG. 1, according to an exemplary embodiment where the QoS threshold is a target data error rate. The various steps in FIG. 2 more particularly describe those in FIG. 1 as follows: step S12 of FIG. 2 corresponds to step S10 of FIG. 1; step S22 of FIG. 2 corresponds to step S20 of FIG. 1; steps S32 and S34 of FIG. 2 correspond to step S30 of FIG. 1; and step S42 of FIG. 2 corresponds to step S40 of FIG. 1.

The technique illustrated in FIG. 2 will be described below according to an exemplary embodiment for systems that utilize bursty data transmissions (e.g., CDMA). In such an embodiment, before the steps of FIG. 2 are performed, a well-known resource management algorithm can be performed at burst setup. Such an algorithm may assume a full system load, and determine the maximum data transmission rate that can be assigned to each user based on, for example, the minimum QoS requirements for each user's data session and the total system resources.

At this stage, the target FER can initially be determined, according to well-known techniques, as the highest FER target that is acceptable for the determined transmission rate. The power required by each wireless unit to achieve this initial target FER, i.e., the minimum power needed for supporting the maximum transmission rate, could then be determined.

Referring to FIG. 2, step S12 determines a load condition of the wireless data system. For example, after determining the power requirements to achieve the initial target FERs for the users in the system, the amount of excess power resources that would remain in the system can be determined. This determined amount of excess power can be used in computing the load metric for determining the load condition in step S10.

According to this example, the load metric could have an inversely proportional relationship to the determined amount of excess resources available.

However, it should be noted that in alternative exemplary embodiments, one or more load metrics not associated with excess power resources can be used to determine the load condition of the wireless data system.

According to step S22, a target data error rate (i.e., the QoS threshold) for the wireless unit(s) is adapted by decreasing the initial assigned target error rate based on the load condition determined in step S12.

FIG. 2 illustrates a particular example where the target error rate is a frame error rate (FER). However, it should be noted that the target data error rate could be another type of rate, for example, a bit error rate.

The extent by which the FER of each assigned burst should be lowered may be determined based on the relationship between the determined system load corresponding to the load metric(s), and the maximum determinable load. For instance, the target FER of a wireless unit can be reduced by an amount that satisfies the following equation:

$$F_T = \max\left(F_H - \frac{(F_H - F_L)(L_H - L)}{(L_H - L_L)}, F_L\right), \quad \text{Eq. 1}$$

where:
$F_T$ is the adapted target FER,
L is a load associated with the determined load condition,
$L_H$ is the highest determinable load for the system,
$L_L$ is a lowest determinable load for the system,
$F_H$ is a highest assignable FER for the wireless unit, and
$F_L$ is a lowest assignable FER.

Given the adapted FER target, the resource management algorithm can determine if the excess power available is enough to reduce the target FER to $F_T$.

Specifically, to achieve lower FERs for data bursts received at a wireless unit, the system must increase the amount of power to the forward link used for transmitting the bursts to the wireless unit. According to well-known techniques in the art, the amount of forward link power required to achieve a specific target FER can be estimated.

If the system determines that not enough power is available to reduce the target FER of the wireless unit to the value determined in Eq. 2, the target FER can be reduced by an amount that corresponds to the amount of excess power available for the wireless unit (according to the well-known estimation techniques mentioned above).

Referring to FIG. 2, in step S32, initial parameters settings may be assigned to a transmitting wireless unit based on the adapted target FER. For example, the parameter may include a signal-to-noise set-point, e.g., an energy bit to thermal noise ratio (Eb/Nt), associated with the target FER. This parameter may be sent to a wireless unit, which is receiving data (i.e., forward link transmissions). Accordingly, the receiving wireless unit may determine the necessary power for data transmissions to achieve this set-point. The Eb/Nt set-point associated with a particular target FER may be determined based on well-known techniques in the art. Similarly, the wireless unit may determine the amount of transmitting power corresponding to the set-point based on well-known techniques.

In step S34, the system may instruct the receiving wireless unit to adapt parameters used in a closed-loop power control technique to maintain the adapted target FER. Step S34 may either be performed in addition to, or as an alternative to, step S32 in order to achieve the adapted target FER.

Such closed-loop power control techniques are well-known in the art. For example, for bursty transmissions, one such technique may involve a base station determining whether a received frame (via the reverse link) is in error or not. If the received frame is in error, the base station may instruct the transmitting wireless unit to increase the power allocated to the data transmissions by an incremental amount. Alternatively, a wireless unit that receives an errant frame may instruct the base station to increase the forward link power by an incremental amount when a received frame is in error.

On the other hand, if the received frame is not in error, the receiving wireless unit may issue an instruction to decrease the transmission power by another incremental amount. Based on well-known techniques, the amounts by which the transmitting power is to be increased or decreased may be determined by the receiving wireless unit to correspond to the target FER to be maintained.

Thus, as indicated in step S42, power is allocated to the data transmission based on the initial parameter settings assigned in step S32 and/or the closed-loop power control parameters of step S34.

Target Fill Efficiency as Target QoS Characteristic

According to another exemplary embodiment, the determined load condition of a system may be used to adjust a target QoS characteristic, i.e., a target fill efficiency, which is associated with the amount of buffered data in a wireless unit.

Scheduling algorithms may apply a data backlog threshold, which indicates the amount of data required to be present in a wireless unit's buffer in order to qualify for a given transmission rate.

For example, in a CDMA system, the value of this threshold can be based on a planned burst duration and on the target fill efficiency of the burst. In particular, a cdma2000 system can assign multiple supplemental channels (SCH) to a wireless unit for data burst transmissions when the data present in a buffer of the wireless unit (for reverse link transmission) or in a buffer of a base station (for forward link transmission) exceeds a certain amount (e.g., a data backlog threshold corresponding to the target fill efficiency).

By assigning various resources (e.g., power, a number of spreading codes, hardware) of the system, a cdma2000 system can assign a SCH burst for a forward link transmission to a wireless unit or reverse link transmission from the wireless unit, where the burst is configured to achieve one of the following data transmission rates of 19.2 (2×); 38.4 (4×); 76.8 (8×); 153.6 (16×); and 307 (32×) kBits/sec. Each of these rates may be associated with a corresponding data backlog threshold.

FIG. 4a illustrates the relationship between the data backlog threshold and a target fill efficiency parameter. Specifically, FIG. 4a shows a situation where the system allocates resources to the SCH burst to achieve a data transmission rate of 2·R (top), and a situation where the system allocates resources to the SCH burst to achieve a rate of R. The shaded areas in the burst represent the capacity filled by the amount of data buffered in a wireless unit. FIG. 4a further illustrates a target fill efficiency parameter of 50%.

As shown in FIG. 4a, the amount of buffered data will only fill 25% of an SCH burst (corresponding to duration T) when the assigned rate is 2·R; while the same amount of data will fill 50% of the burst (corresponding to duration 2·T) when the assigned rate is R.

Assume that the target fill efficiency parameter of a burst scheduling algorithm is set at 50%. Thus, the wireless unit would be required to hold twice as much buffered data to be assigned a burst transmission rate of 2·R (i.e., burst duration of T), than a burst transmission rate of R (burst duration 2·T). Accordingly, the data backlog threshold associated with the 2·R rate is twice as much as the data backlog threshold associated with the transmission rate of R.

When a cdma200 system is experiencing a high load, it is important to keep the target fill efficiency for SCH bursts at relatively high levels so that system resources such as power, spreading (Walsh) codes and hardware shared among all the users are not wasted. However, if a high target fill efficiency is used to assign burst transmission rates during periods of low system loading, users may be assigned low rates (and, thus, experience increased download latencies), even though there are unclaimed resources available.

Thus, in an exemplary embodiment of the present invention, one or more load metrics are used to adjust the target fill efficiency. Accordingly, the data backlog thresholds for the various assignable burst transmission rates are adjusted.

FIG. 3 is a flowchart more particularly illustrating the method of FIG. 1, according to an exemplary embodiment where an adapted QoS threshold is a data backlog threshold for a particular data transmission rate. The various steps in FIG. 3 more particularly describe those in FIG. 1 as follows: step S14 of FIG. 3 corresponds to step S10 of FIG. 1; step S24 of FIG. 3 corresponds to step S20 of FIG. 1; steps S35-S38 of FIG. 3 correspond to step S30 of FIG. 1; and step S42 of FIG. 3 corresponds to step S40 of FIG. 1.

In step S14, a load condition can be determined for the wireless data system according to one or more load metrics.

According to step S24, the target fill efficiency parameter of a burst scheduling algorithm can be adapted based on the determined load condition. According to an exemplary embodiment, the target fill efficiency is lowered as the system load decreases.

For example, the target fill efficiency parameter may be adjusted linearly depending on the value of the loading metric(s) and its relationship to the maximum and minimum determinable values for the load metric. For instance, the target fill efficiency parameter may be adjusted to satisfy the following equation:

$$T = \min\left(T_L - \frac{(T_H - T_L)(L - L_L)}{(L_H - L_L)}, T_H\right), \qquad \text{Eq. 2}$$

where:

T is the adapted data target fill efficiency,

L is a load associated with the determined load condition, $L_H$ is the highest determinable load for the system, $L_L$ is a lowest determinable load for the system, $T_H$ is the highest assignable target fill efficiency, and $F_L$ is a lowest assignable data backlog threshold (e.g., corresponding to the lowest amount of buffered data required for a SCH burst).

It should be noted that SCH bursts generally require some space for overhead. Therefore, the highest assignable target fill efficiency $T_H$ is generally smaller than 100%.

For example, if the load metric is the number of users using the wireless system, and the maximum number of users is 20, the target fill efficiency parameter can be decreased by half when the current number of users is 10.

In step S35, the data backlog for the various assignable data transmission rates are adapted based on the adapted target fill efficiency. According to an exemplary embodiment, each data backlog threshold is decreased by the same percentage by which the target fill efficiency parameter is lowered in step S24.

Thus, the data backlog threshold for each assignable rate may be adapted in a manner similar to the target fill efficiency. For example, each data backlog threshold may be adapted linearly, based on the measured load at the time of burst rate assignment.

When the data backlog thresholds for the various assignable data rates are adapted in such a manner, it becomes easier for a wireless unit to be assigned a higher data transmission rate (and improved QoS) as the system load lightens.

Referring back to FIG. 3, in step S36, the actual data present in the buffer may be measured at a wireless unit when the data burst is to be used for a reverse link transmission sent by the wireless unit. On the other hand, when the data burst is to be used for a forward link transmission to a wireless unit, the buffered data may be measured at a base station. It should be noted that in alternative embodiments, other parameters representing the data backlog of a wireless unit can be used. For example, a data backlog can be calculated according to a well-known filtering technique, which utilizes both the amount of buffered data and a history of data transmissions for the wireless unit(s).

In step S37, the measured amount of buffered data (or other calculated data backlog parameter) to be transmitted to or from the wireless unit is compared to the data backlog thresholds of the assignable burst rates.

According to an exemplary embodiment, the data backlog thresholds of the rates may be communicated by the system to the wireless units, so that each wireless unit may perform the comparisons for reverse link transmissions. In an alternative exemplary embodiment, the wireless unit may transmit the measured amount of buffered data to the system, which performs the comparisons for the reverse link transmissions.

Based on these comparisons, step S44 determines the highest data transmission rate whose data backlog threshold is met by the buffered data. The system may assign this determined rate to the SCH burst to be transmitted to/from the wireless unit.

Figure 4B:
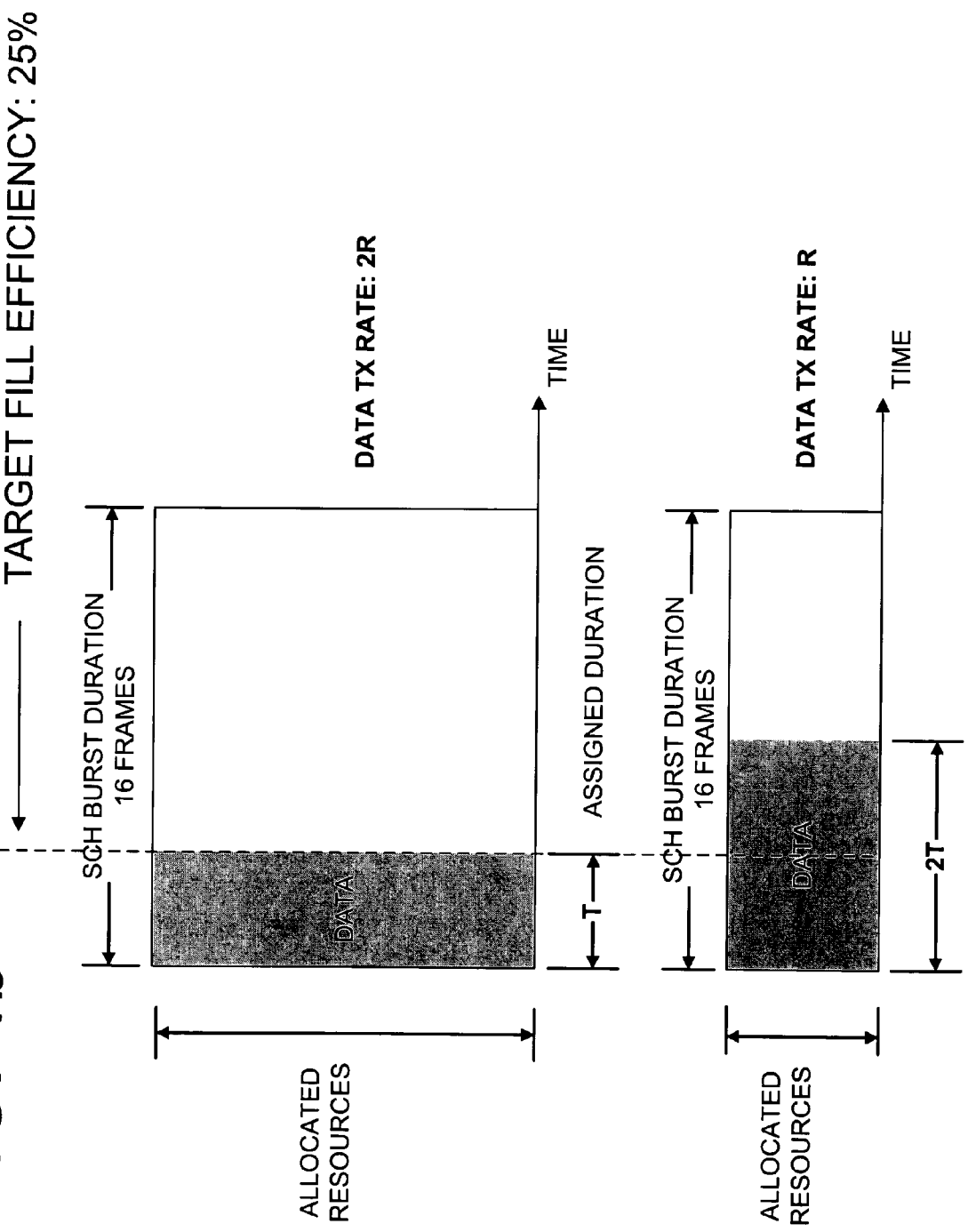

Therefore, in step S46, the system allocates the necessary resources for the wireless unit's burst transmissions to achieve the assigned rate. Techniques well-known in the art may be used to determine the resources (e.g., number of spreading codes, etc.) required to achieve an assigned transmission rate FIGS. 4a and 4b shows an example whereby a technique, according to an exemplary embodiment of the present invention, is used to lower the target fill efficiency parameter from 50% to 25%. FIG. 4a represents a period of higher system load where the target fill efficiency is set at 50%. During such a period, the wireless unit will qualify for a rate of R whose associated burst duration is 2·T.

However, during a period where the system load decreases by half, as illustrated by FIG. 4b, the target fill efficiency is lowered to 25%. Thereafter, the data backlog thresholds of the assignable transmission rates are similarly adjusted, so that the amount of buffered data (represented by the shaded sections) of the wireless unit qualifies for a burst transmission with a rate of 2·R. Accordingly, the wireless unit's assigned burst will have a burst duration of T.

Although the technique of FIG. 3 is described above as being implemented in a cdma2000 system, it should be noted that such description merely provides an example and does not limit the present invention. It will be obvious to one of those of ordinary skill in the art that the aforementioned steps can be modified so the underlying principles of this technique can used with various other types of bursty and non-bursty wireless data systems.

For example, the system may comprise a TDMA system, whereby a wireless unit's data transmission rate is lowered during periods of light loading by increasing the number of time slots allocated to the wireless unit, based on the amount of data backlogged in the wireless unit. Other various changes and modifications covered by the principles of the present invention will be contemplated by those ordinarily skilled in the art.

It should be noted that the techniques described in FIGS. 2 and 3 are merely illustrative of exemplary embodiments and, thus, should not be construed to limit the invention. Various modifications and changes to these steps, as will be contemplated by those of ordinary skill in the art, are covered by exemplary embodiments of the present invention.

The invention being thus described, it will be obvious that the same may be varied in many ways. Such variations are not to be regarded as a departure from the spirit and scope of the invention, and all such modifications are intended to be included within the scope of the following claims.

We claim:

1. A method of communication in a wireless system comprising:
    adapting at least one target Quality of Service (QoS) characteristic in response to at least one network usage metric meeting a threshold requirement for the at least one network usage metric; and
    allocating resources of the wireless system to wireless units based on the at least one target QoS characteristic.

2. The method of claim 1, further comprising:
    determining a load condition of the wireless system; and
    adapting a target QoS characteristic based on the determined load condition; and
    allocating resources of the wireless system based on the adapted QoS characteristic.

3. The method of claim 2, wherein the adapting step adapts the target QoS characteristic in order to increase a data rate for each wireless unit as the determined load condition indicates a lower load in the wireless data system.

4. The method of claim 2, wherein the determining step determines the load condition as a function of at least one of the following parameters of the wireless data system: total forward link power used; total reverse link interference rise above thermal noise; total number of users; number of data channels used; and number of spreading codes used.

5. The method of claim 2, wherein the adapting step includes,
    determining one or more parameters of a data transmission based on the adapted target QoS characteristic; and
    allocating resources to the data transmission based on the determined parameters.

6. The method of claim 5, wherein
    the wireless data system is a code-division multiple access (CDMA) system, and
    the allocating step allocates a supplemental channel (SCH) burst transmission for the wireless unit based on the determined parameters.

7. The method of claim 6, wherein
    the wireless data system is a CDMA2000 system, and
    the allocating step further allocates at least one of a duration and a number of assigned spreading codes for the SCH burst transmission based on the determined parameters.

8. The method of claim 2, wherein
the wireless data system utilizes bursty data transmissions, the target QoS characteristic being a target fill efficiency, the target fill efficiency being a portion of a burst to be filled by transmitted data, and
the adapting step decreases the target fill efficiency as the determined load condition indicates a lower load in the wireless system.

9. The method of claim 8, wherein the allocating step assigns a burst transmission for transmitting buffered data, if an amount of the buffered data exceeds a data backlog threshold corresponding to the decreased target fill efficiency.

10. The method of claim 9, wherein the allocating step further assigns a duration for the burst transmission, the assigned duration allowing the burst transmission to achieve a data rate corresponding to the data backlog threshold.

11. The method of claim 10, wherein the allocating step allocates resources for transmitting the buffered data within the assigned duration, the allocated resources including at least one of: power, infrastructure hardware, and a number of spreading codes.

12. The method of claim 9, wherein adapting step adapts the target fill efficiency according to a relationship between a load (L) associated with the determined load condition and a highest determinable load ($L_H$) for the CDMA system.

13. The method of claim 12, wherein adapting step adapts the target fill efficiency, such that the adapted target fill efficiency (T) satisfies an equation:

$$T = \min\left(T_L - \frac{(T_H - T_L)(L - L_L)}{(L_H - L_L)}, T_H\right)$$

where
$L_L$ is the lowest determinable load for the CDMA system,
$T_L$ is a lowest assignable data backlog threshold, and
$T_H$ is a highest assignable data backlog threshold.

14. The method of claim 9, wherein
the wireless system is a code-division multiple access (CDMA) system, and
the allocating step allocates a supplemental channel (SCH) burst transmission for transmitting buffered data, if an amount of the buffered data exceeds the data backlog threshold.

15. A method of communication in a wireless system comprising:
adapting at least one target quality of service (QoS) characteristic in response to at least one network usage metric meeting a threshold requirement for the at least one network usage metric.

16. The method of claim 15, further comprising:
determining a load condition of the wireless system;
adapting a target QoS characteristic based on the determined load condition; and
communicating the adapted target QoS characteristic to one or more wireless units.

17. The method of claim 16, wherein
the target QoS characteristic is a target data error rate, and
the adapting step decreases the target data error rate as the determined load condition indicates a lower load in the wireless system.

18. The method of claim 17, wherein
the wireless data system is a code-division multiple access (CDMA) system and the target QoS characteristic is a target frame error rate (FER) assigned to the wireless unit, and
the adapting step adapts the target FER based on a relationship between a load (L) associated with the determined load condition and a highest determinable load ($L_H$) for the CDMA system.

19. The method of claim 18, wherein the adapting step adapts the target FER ($F_T$), such that the adapted target FER satisfies an equation:

$$F_T = \max\left(F_H - \frac{(F_H - F_L)(L_H - L)}{(L_H - L_L)}, F_L\right)$$

where
$L_L$ is the lowest determinable load for the CDMA system,
$F_H$ is a highest assignable FER, and
$F_L$ is a lowest assignable FER.

20. A method of communication in a wireless unit comprising:
receiving at least one target Quality of Service (QoS) characteristic adapted in response to at least one network usage metric meeting a threshold requirement for the at least one network usage metric; and
allocating power to a data transmission in response to a load condition as indicated by the at least one received target QoS characteristic.

21. The method of claim 20, further comprising:
receiving a target QoS characteristic in response to a load condition;
determining at least one data transmission parameter based on the adapted target QoS characteristic; and
allocating resources to a data transmission based on the determined at least one data transmission parameter.

22. The method of claim 21, wherein the allocating step allocates power to the data transmission based on the determined parameters.

23. The method of claim 22, wherein the allocating step increases the amount of power allocated to the data transmission when the adapting step decreases the target data error rate.

24. The method of claim 21, wherein the determining step determines an initial signal-to-noise set-point for allocating power to a data transmission.

25. The method of claim 21, wherein the determining step determines at least one parameter utilized in closed-loop power control of a wireless unit.

26. A method of communication in a wireless unit comprising:
transmitting buffered data in a burst transmission that is operable to achieve a data transmission rate, when the amount of buffered data qualifies for the data transmission rate according to at least one data transmission parameter indicative of a load condition;
receiving one or more data backlog thresholds that are indicative of a load condition;
measuring an amount of buffered data to be transmitted;
determining a highest one of the received data backlog thresholds met by the measured amount of buffered data; and
transmitting the buffered data in a burst transmission operable to achieve a data transmission rate corresponding to the determined data backlog threshold.

* * * * *